Dec. 7, 1926.

A. E. NORRIS 1,609,419

POWER OPERATED DRUM OR WINCH APPARATUS

Filed Feb. 14, 1925

Inventor
Almon E. Norris,

Patented Dec. 7, 1926.

1,609,419

UNITED STATES PATENT OFFICE.

ALMON E. NORRIS, OF BROOKLINE, MASSACHUSETTS.

POWER-OPERATED DRUM OR WINCH APPARATUS.

Application filed February 14, 1925. Serial No. 9,170.

This invention relates to winding drums or winches operated by power for the handling of heavy loads through the winding or unwinding of cables thereon. The object of the invention is to provide an improved form of apparatus by which the act of starting and checking the movement of such loads may be accomplished with greater ease and facility.

The invention will be best understood by reference to the following description when taken in connection with the accompanying illustration of one specific embodiment thereof, while the scope will be more particularly pointed out in the appended claims.

In the drawings,—

Figure 1:
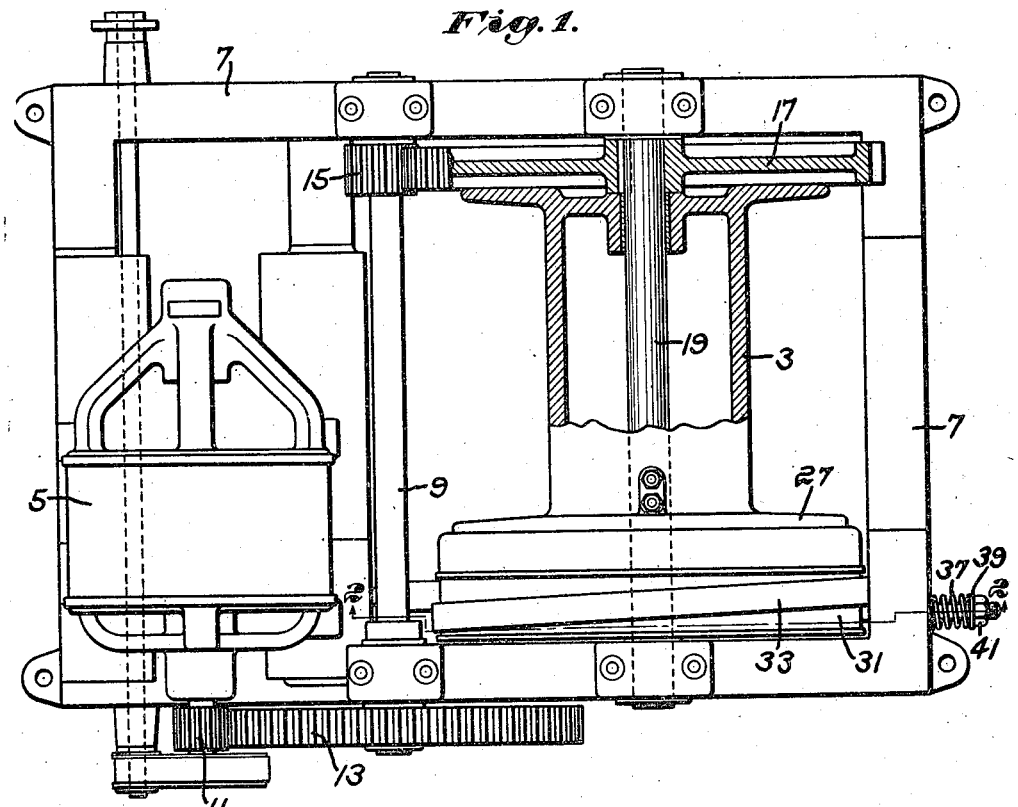
Fig. 1 is a plan view of an apparatus embodying one form of my invention.

Referring to the drawings and to the illustrative embodiment of my invention, I have there shown a power driven winch or cable winding drum 3 which is adapted to be driven from an electric motor 5 through transmission gearing of the same general type as is shown in my prior Patent No. 774,449, dated November 8, 1904.

Figure 2:
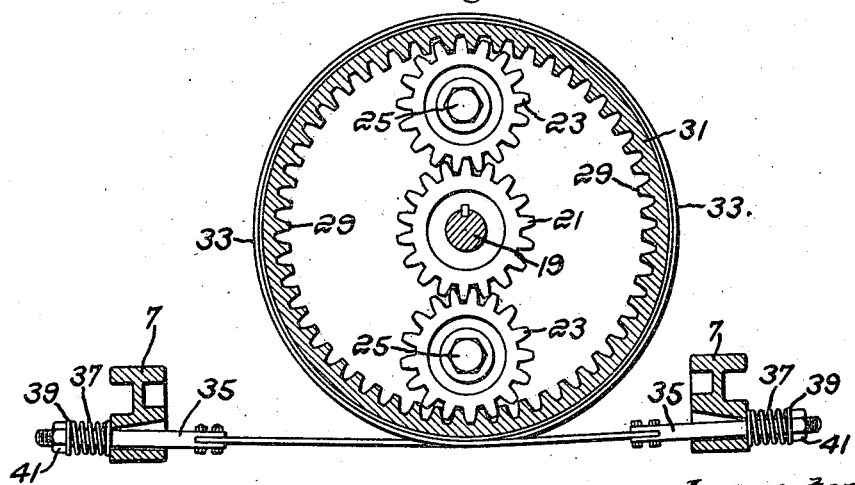
Fig. 2 is a sectional elevation on the line 2—2 showing the relation of the friction band to the rotary element of the planetary transmission gear.

The motor 5 is mounted upon the frame 7 and serves to drive a countershaft 9 through the pinion 11 and driving gear 13. The opposite end of the countershaft carries the driving pinion 15 meshing with the gear 17 keyed to the shaft 19 on which the drum 3 is mounted to turn freely. The drum is rotated from the shaft 19 through a planetary transmission gear carried at the opposite end of the shaft and comprising (see Fig. 2) the spur gear 21 keyed to the shaft and meshing with pinions 23, the latter being mounted on studs 25 carried by and rotatable with the head 27 of the drum 3. The pinions 23 in turn mesh with a common internal gear 29 formed on the inner flanged face of a friction member 31, the latter loosely mounted on the winch shaft 19.

Encircling the flanged member 31 is the friction band 33 having its ends oppositely extending across the under side of the flanged member and anchored or secured to members of the frame. Any attempt to rotate the flanged member in either direction will tend to wrap the friction band about and upon the flanged member 31 and thereby hold it frictionally against rotation. With the flanged member so held, rotation of the winch shaft by the motor in either direction will operate through the gears 23 and the internal gear 29 will thereby constitute parts of a well-known form of planetary gear to rotate the winch in the same direction but at a reduced speed, the speed depending upon the ratio of gearing.

In the handling of heavy weights, as, for example, where the apparatus is employed for swinging the boom of a derrick, the inertia of the parts is such that, where the adjustment of the friction band is relied upon to ease or cushion this action, the starting and stopping of the motion is apt to be accompanied by sudden jerks or shocks. I have found that by yieldably anchoring one or both ends of the friction band so that the latter is caused to yield when a load is suddenly thrust on the winch, the band being gradually restored to its normal condition as the momentum or inertia is overcome, such shocks may be largely eliminated and ease of operation secured not otherwise obtainable. For this purpose, therefore, the ends of the friction band are secured to the rods 35 (see Fig. 2) which pass through flared openings in the frame member 7 and are yieldably anchored therein by means of the compression springs 37 which are held between the frame members and washers 39 held on the rods by the nuts 41 engaging the threaded ends of the rods. The springs 37 are preferably so proportioned that when the load is first thrown on, the anchoring spring on the taut side of the band will yield until the rod 35 is brought to rest against the stationary part of the frame 7, the spring at the opposite side, however, taking up the slack so that it still exerts a pull on the band. This cushions the shock by providing a slight initial turning movement of the winch, such slower movement, however, being proportionately more powerful. As the momentum of the load is overcome, the band automatically returns to its normal position, the speed of the winch being gradually increased until it is rotated at full speed. In the case of sudden, abnormal shocks or loads, the flanged member may slip within the band, but normally such slippage is absent, the flanged member turning slightly in one direction or the other with the band to cushion the effect of jerks and shocks ordinarily encountered.

By this means the smoothness of the operation of the winch is greatly increased and the freedom from shocks and jars assured.

While I have herein shown and described for purposes of illustration one specific embodiment of the invention, it is to be understood that the same may be varied as to its mechanical construction, form and relative arrangement of parts, all without departing from the spirit of the invention.

I claim:—

1. In a winding apparatus, a power driven drum, a drive shaft on which the drum is rotatable, a planetary transmission gearing for the drum including a driving pinion secured to the drum shaft, a gear mounted on said drum and meshing with said pinion, a rotatable member having an internal gear meshing with said rotatably mounted gear and having an externally presented friction surface, a friction band engaging said member, and springs through which opposite ends of said band are anchored to permit movement of the rotatable member in starting or checking a load.

2. In a winding apparatus, a power driven drum, a planetary transmission gearing for driving the drum, the same including a rotatable member, a friction band engaging said member, and yieldable spring devices for anchoring both opposite ends of said band.

3. In a winding apparatus, a power driven drum and planetary transmission gearing for driving the drum, the same including a rotatable member, a friction band engaging said member and yieldably anchored at both opposite ends, and a limiting abutment for each end of the band whereby it is capable of a yielding but limited movement.

In testimony whereof, I have signed my name to this specification.

ALMON E. NORRIS.